(12) United States Patent
Seo et al.

(10) Patent No.: US 10,772,124 B2
(45) Date of Patent: Sep. 8, 2020

(54) METHOD FOR TRANSMITTING OR RECEIVING SIGNAL IN WIRELESS COMMUNICATION SYSTEM AND APPARATUS FOR SAME

(71) Applicant: LG ELECTRONICS INC., Seoul (KR)

(72) Inventors: Inkwon Seo, Seoul (KR); Kijun Kim, Seoul (KR); Eunsun Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/316,609

(22) PCT Filed: Jun. 29, 2017

(86) PCT No.: PCT/KR2017/006881
§ 371 (c)(1),
(2) Date: Jan. 9, 2019

(87) PCT Pub. No.: WO2018/012766
PCT Pub. Date: Jan. 18, 2018

(65) Prior Publication Data
US 2019/0306879 A1    Oct. 3, 2019

Related U.S. Application Data

(60) Provisional application No. 62/373,970, filed on Aug. 11, 2016, provisional application No. 62/360,962, filed on Jul. 11, 2016.

(51) Int. Cl.
| | |
|---|---|
| *H04W 74/02* | (2009.01) |
| *H04W 76/11* | (2018.01) |
| *H04L 1/00* | (2006.01) |
| *H04L 5/00* | (2006.01) |
| *H04W 28/02* | (2009.01) |

(Continued)

(52) U.S. Cl.
CPC .......... *H04W 74/02* (2013.01); *H04L 1/0038* (2013.01); *H04L 5/0055* (2013.01);
(Continued)

(58) Field of Classification Search
CPC ..... H04W 74/02; H04W 72/12; H04W 72/14; H04W 72/0473; H04W 72/0466;
(Continued)

(56) References Cited

U.S. PATENT DOCUMENTS

| | | |
|---|---|---|
| 9,253,692 B1 | 2/2016 | Shah et al. |
| 2013/0022012 A1 | 1/2013 | Lee et al. |

(Continued)

OTHER PUBLICATIONS

PCT International Application No. PCT/KR2017/006881, Written Opinion of the International Searching Authority dated Oct. 17, 2017, 26 pages.

(Continued)

*Primary Examiner* — Yaotang Wang
(74) *Attorney, Agent, or Firm* — Lee, Hong, Degerman, Kang & Waimey

(57) ABSTRACT

A method for a terminal transmitting an uplink signal in a wireless communication system, according to one embodiment of the present invention, comprises the steps of: receiving, from a base station, information indicating a contention-based transmission scheme or a contention free-based transmission scheme; and transmitting uplink data according to the transmission scheme indicated by the information received, wherein when the indicated transmission scheme is the contention-based transmission scheme, the terminal transmits, in addition to the uplink data, information for identifying the terminal, wherein the terminal may prioritize transmission success of the information for identifying the terminal that is additionally transmitted over transmission success of the uplink data transmission.

13 Claims, 7 Drawing Sheets

(51) Int. Cl.
  *H04W 72/04*    (2009.01)
  *H04W 72/14*    (2009.01)
  *H04W 72/12*    (2009.01)

(52) U.S. Cl.
  CPC ... *H04W 28/0278* (2013.01); *H04W 72/0466* (2013.01); *H04W 72/0473* (2013.01); *H04W 72/12* (2013.01); *H04W 72/14* (2013.01); *H04W 76/11* (2018.02)

(58) Field of Classification Search
  CPC . H04W 28/0278; H04W 76/11; H04W 52/50; H04W 52/16; H04W 72/1284; H04L 5/0055; H04L 1/0038; H04L 1/007; H04L 1/18
  See application file for complete search history.

(56) References Cited

U.S. PATENT DOCUMENTS

2016/0183299 A1    6/2016  Fang et al.
2019/0132866 A1*   5/2019  Goto ................... H04L 5/00

OTHER PUBLICATIONS

NTT Docomo, "Uplink multiple access schemes for NR", 3GPP TSG RAN WG1 Meeting #85, R1-165174, May 2016, 4 pages.
Nokia, et al., "Uplink contention-based access in 5G New Radio", 3GPP TSG RAN WG1 Meeting #85, R1-165022, May 2016, 3 pages.

* cited by examiner

METHOD FOR TRANSMITTING OR RECEIVING SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/006881, filed on Jun. 29, 2017, which claims the benefit of U.S. Provisional Application No. 62/360,962, filed on Jul. 11, 2016, and 62/373,970, filed on Aug. 11, 2016, the contents of which are all hereby incorporated by reference herein in their entirety.

TECHNICAL FIELD

The present invention relates to a wireless communication system, and more particularly, to a method for transmitting or receiving an uplink signal in accordance with a contention based transmission scheme or a contention free based transmission scheme and an apparatus for the same.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

DISCLOSURE

Technical Problem

An object of the present invention is to provide a method for efficiently and exactly transmitting or receiving an uplink signal in accordance with a contention based transmission scheme or a contention free based transmission scheme and an apparatus for the same.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for transmitting an uplink signal by a user equipment (UE) in a wireless communication system according to one aspect of the present invention comprises receiving, from a base station, information indicating one of a contention based transmission scheme or a contention free based transmission scheme; and transmitting uplink data based on the transmission scheme indicated by the received information, wherein when the indicated transmission scheme is the contention based transmission scheme, the UE transmits, in addition to the uplink data, information for identifying the UE, and the UE prioritizes transmission success of the information for identifying the UE, which is additionally transmitted, over transmission success of the uplink data.

To achieve the object of the present invention, a user equipment (UE) for transmitting an uplink signal in a wireless communication system according to another aspect of the present invention comprises a receiver; a transmitter; and a processor for receiving, from a base station, information indicating one of a contention based transmission scheme or a contention free based transmission scheme by controlling the receiver, and transmitting uplink data based on the transmission scheme indicated by the received information by controlling the transmitter, wherein when the indicated transmission scheme is the contention based transmission scheme, the processor transmits, in addition to the uplink data, information for identifying the UE, and the processor prioritizes transmission success of the information for identifying the UE, which is additionally transmitted, over transmission success of the uplink data.

The UE may set a transmission power of the information for identifying the UE to be greater than a transmission power of the uplink data, set a coding rate of the information for identifying the UE to be lower than a coding rate of the uplink data, transmit the information for identifying the UE and the uplink data on different resource pools, or scramble the information for identifying the UE at a scrambling value having blind detection complexity lower than that of the uplink data.

The uplink data may be scrambled by the information for identifying the UE, and the information for identifying the UE may be scrambled by a cell identifier of the base station.

If the number of UEs which have accessed a cell of the base station is greater than a threshold value, the received information may indicate the contention free based transmission scheme, and if the number of UEs which have accessed the cell of the base station is less than the threshold value, the received information may indicate the contention based transmission scheme.

The UE may determine that both the transmission of the uplink data and the transmission of the information for identifying the UE have been successfully performed if an ACK (acknowledge) signal is received, determine that the transmission of the information for identifying the UE has been successfully performed but the transmission of the uplink data has been failed if a UE-specific NACK (negative ACK) signal is received, and determine that both the transmission of the uplink data and the transmission of the information for identifying the UE have been failed if a broadcast NACK signal is received without reception of the ACK signal.

The UE-specific NACK (negative ACK) signal may include an uplink grant for retransmission of the uplink data, and the UE may retransmit the uplink data based on the uplink grant in accordance with the contention free based transmission scheme.

The UE may switch to the contention free based transmission scheme if an ACK (acknowledge) signal for transmission of the uplink data according to the contention based transmission scheme is not received for a certain time period or a NACK (negative ACK) signal is received for a certain number of times or more.

The UE may request the base station of switching to the contention free based transmission scheme by transmitting a scheduling request signal, wherein the scheduling request signal may be transmitted based on the contention based transmission scheme.

The scheduling request signal may include at least one of the information for identifying the UE and a buffer state report.

To achieve the object of the present invention, a method for receiving an uplink signal by a base station in a wireless communication system according to other aspect of the present invention comprises transmitting information indicating one of a contention based transmission scheme or a contention free based transmission scheme; attempting to detect uplink data of a UE based on the transmission scheme indicated by the transmitted information; and transmitting an acknowledge (ACK) signal or a negative ACK (NACK) signal to the UE in accordance with whether the base station succeeded in detecting the uplink data, wherein when the indicated transmission scheme is the contention based transmission scheme, the base station attempts to detect information for identifying the UE, in addition to the uplink data, and when the base station succeeded in detecting both the uplink data and the information for identifying the UE, the base station transmits the ACK signal.

The base station may transmit a UE-specific NACK (negative ACK) signal if detection of the information for identifying the UE has been successfully performed but detection of the uplink data has been failed, and may transmit a broadcast NACK signal if detection of the information for identifying the UE has been failed.

The UE-specific NACK signal may include an uplink grant for retransmission of the uplink data, and the base station may receive the uplink data retransmitted by the contention free based transmission scheme based on the uplink grant.

The uplink data may be de-scrambled by the information for identifying the UE, and the information for identifying the UE may be de-scrambled by a cell identifier of the base station.

If the number of UEs which have accessed a cell of the base station is greater than a threshold value, the transmitted information may indicate the contention free based transmission scheme, and if the number of UEs which have accessed the cell of the base station is less than the threshold value, the transmitted information may indicate the contention based transmission scheme.

Advantageous Effects

According to one embodiment of the present invention, a contention based transmission scheme or a contention free based transmission scheme may be configured/switched, whereby an uplink signal may be transmitted adaptively to a communication environment. Particularly, in case of the contention based transmission scheme, a high priority may be given to information for identifying a UE, which is additionally transmitted in addition to uplink data, whereby the probability of success of contention based transmission may be improved, and retransmission may be performed more exactly and efficiently if transmission is failed.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
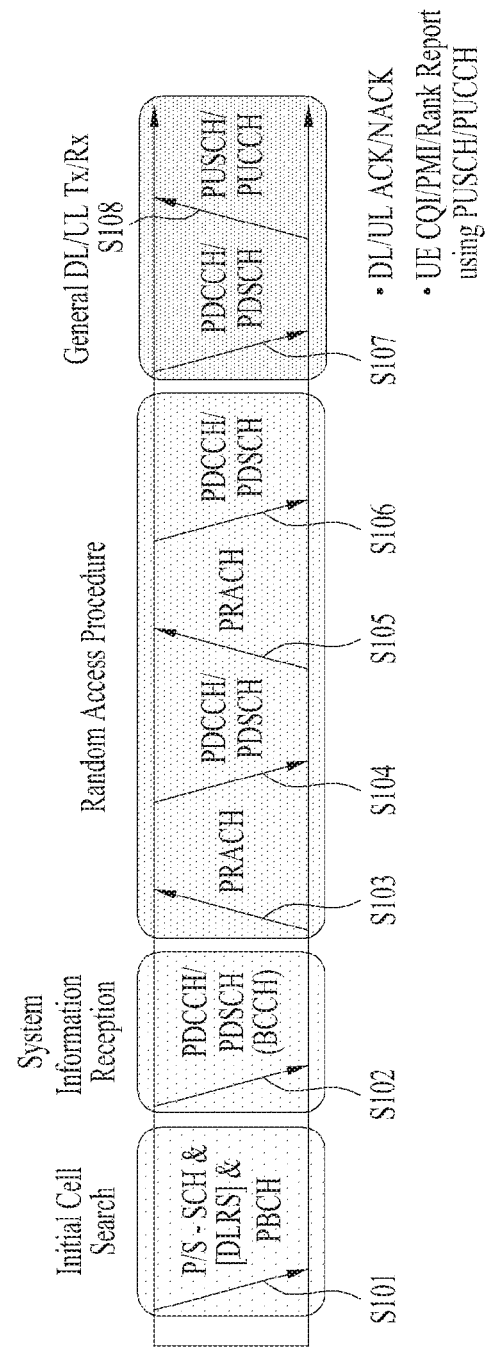
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from a base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
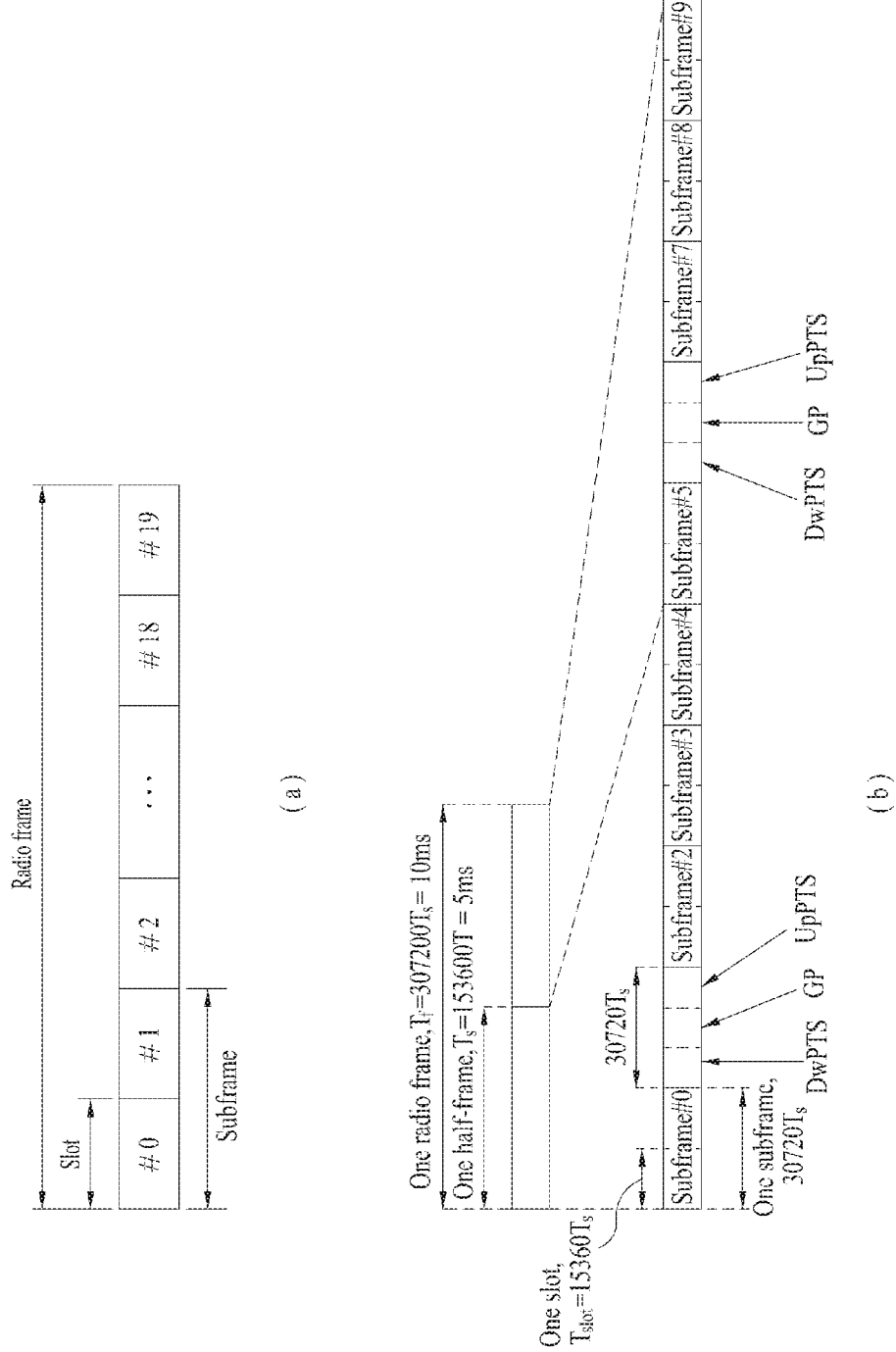
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
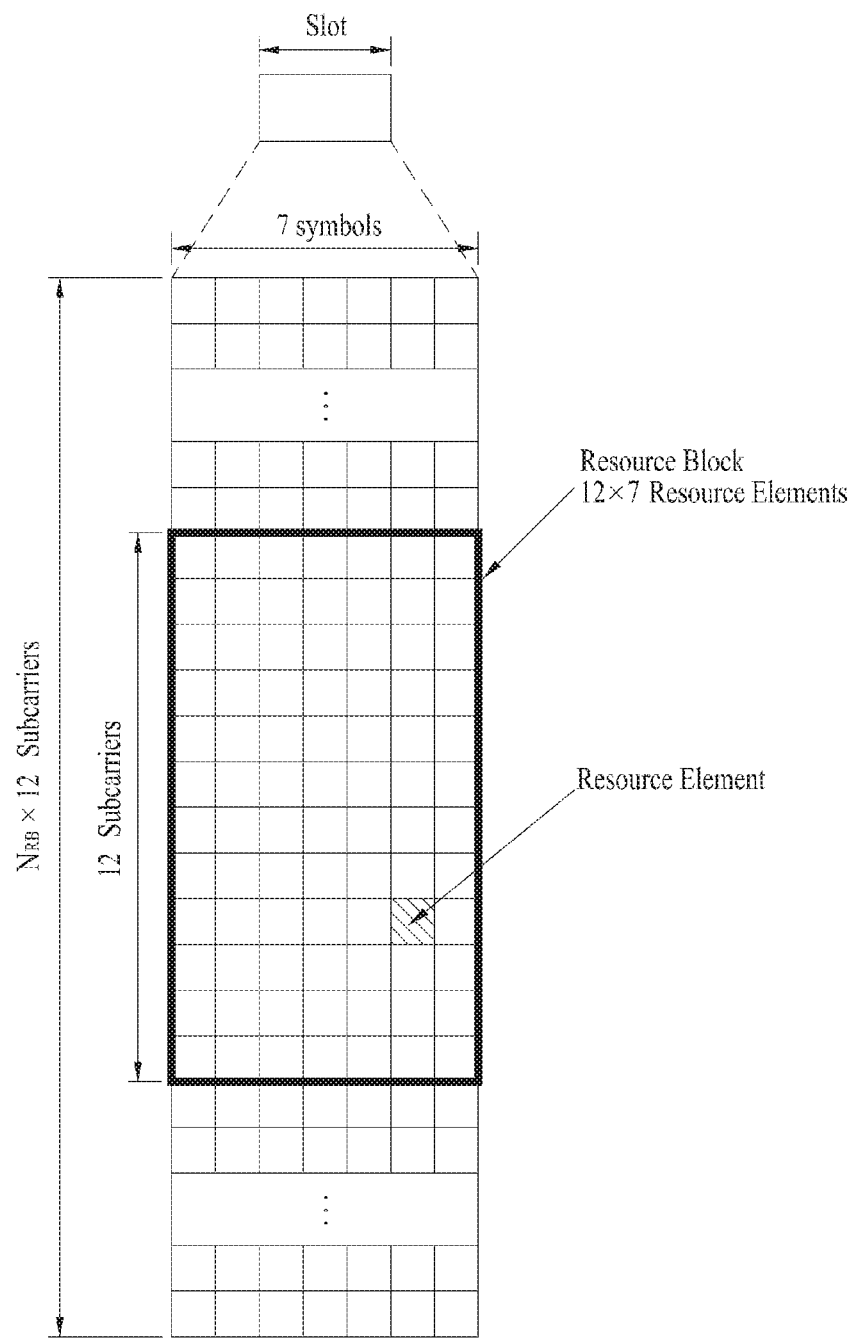
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
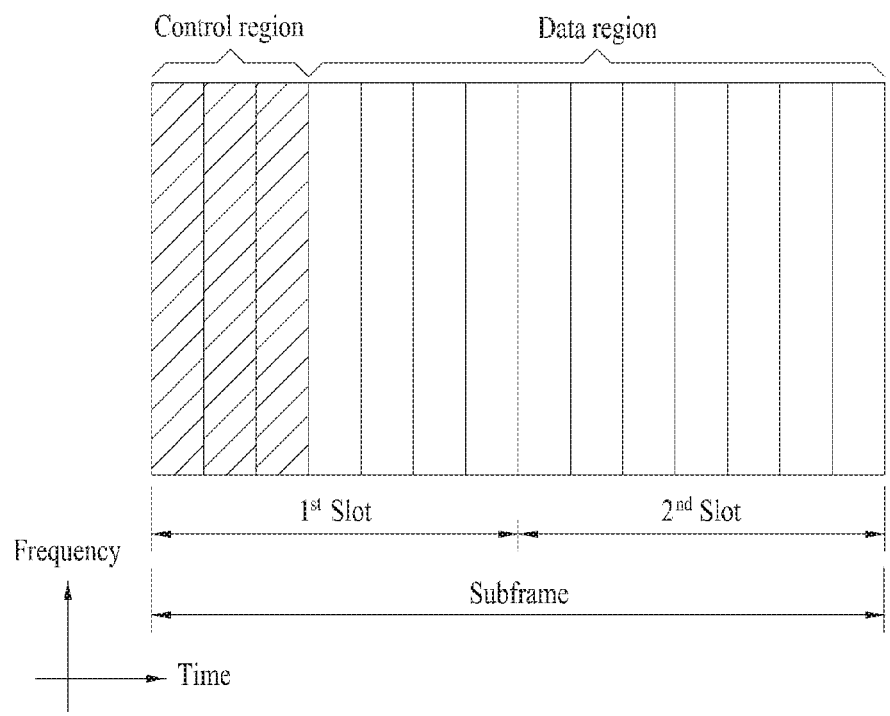
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
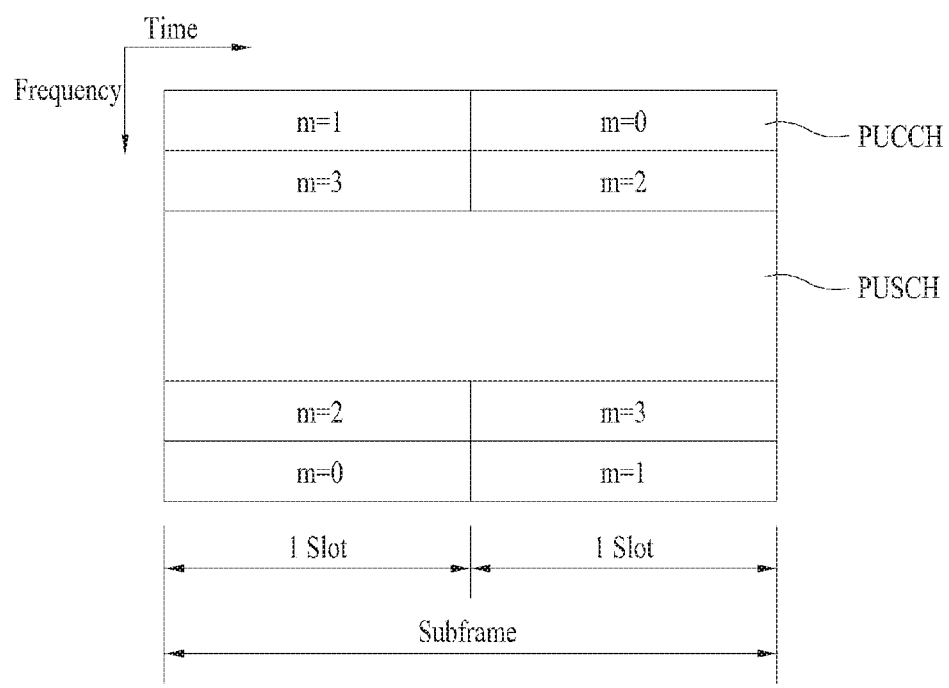
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR(Scheduling Request), HARQ-ACK and/or CSI (Channel State Information)s.

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
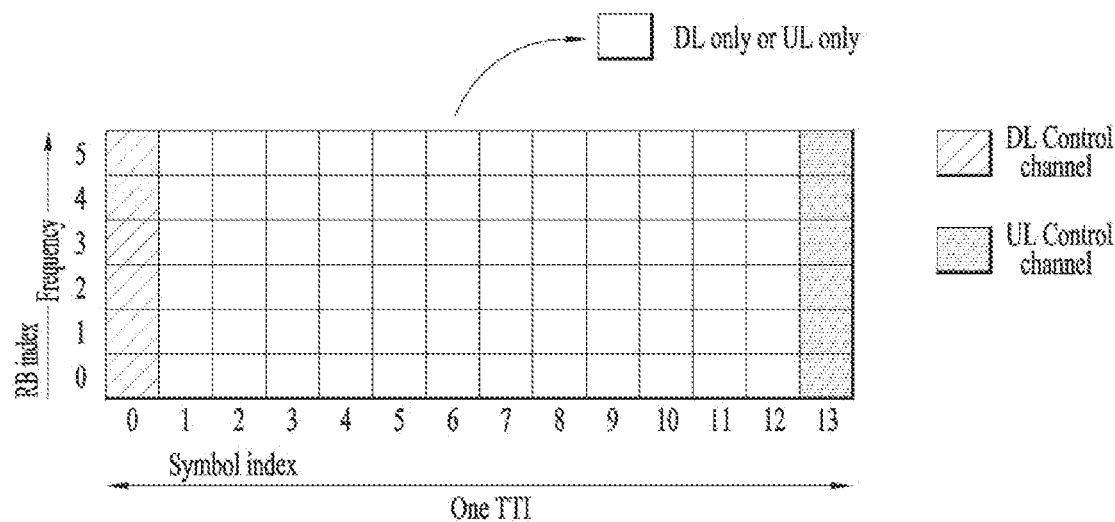
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/base station, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows a base station and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
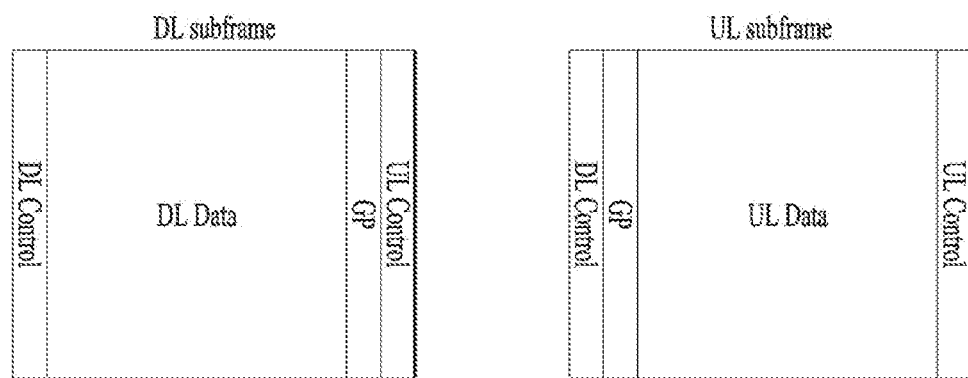
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe, and is located between the DL control region and the UL data region at the UL subframe.

The GP may include Tx/Rx switching time of the base station/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

Hybrid Multiple Access & ACK/NACK Signaling

Hereinafter, hybrid multiple access and ACK/NACK signaling method for contention based transmission will be described.

In New RAT (NR), contention based UL transmission may be considered for latency reduction, signaling overhead reduction, power saving, etc. In this case, the contention based UL transmission may mean that a UE performs UL transmission using a random resource within a given resource region without exact allocation of UL resource and timing. The contention based UL transmission may also mean that the UE performs UL transmission without UL grant (i.e., control signaling for UL transmission) defined in the LTE system.

In this specification, the contention based UL transmission may be applied to only a part of various UL transmitting signals (e.g., SR, BSR, PUSCH, PUCCH, and SRS) defined in UL of the legacy LTE. For example, contention based transmission may be applied to only a scheduling request (SR) and a buffer status report (BSR), or may be applied to only initial transmission of PUSCH. Contention based transmission may not be applied to transmission of a channel in which contention based transmission is not defined or retransmission of PUSCH.

This contention based transmission may reduce overhead and latency for transmitting or receiving control signaling, and may have a power saving effect by reducing blind detection of a UE for control signaling if there is no UL transmission. On the other hand, since there is no dedicated resource allocation per UE for UL transmission in contention based transmission, a problem occurs in that it is difficult for a network to specify a UE which has performed UL transmission in a specific resource.

In this specification, methods for increasing reliability for UL transmission by solving the problem are suggested. The suggested methods may be implemented independently or in combination, and if contention based transmission is introduced even in a system other than NR, these methods may be applied to the system. Also, for convenience of description, although the invention description has been given in view of time/frequency resources, the present invention is not limited to time/frequency domains, and may be applied to multiple access schemes based on code domain resources such as scrambling and spreading.

<ACK/NACK Transmission and Transmission of UEID>

As another method for performing ACK/NACK signaling for contention based UL transmission, UE ID based ACK/NACK transmission may be considered.

In contention based UL transmission, UE ID may be inserted into a PUSCH transport block (TB) in the form of a physical layer message or a higher layer message. Therefore, a base station which has normally decoded the PUSCH TB may identify a UE, which has transmitted the corresponding PUSCH TB, through UE ID. On the contrary, if the base station fails to decode UL transmission of the UE, a problem occurs in that it is not possible to specify a transmitting UE. The base station may broadcast NACK to indicate that decoding has been failed in a corresponding resource.

Unlike a broadcasting method of NACK, one embodiment of the present invention suggests a method for delivering NACK from a base station through UE-dedicated signaling. In order that the base station transmits NACK in a UE-dedicated method, the base station should normally acquire at least UE ID information even though decoding of the corresponding UL transmission is failed. Therefore, a high priority may be given to UE ID in 'message+UE ID' transmitted in contention based transmission. For example, a signal corresponding to UE ID may be transmitted at a power higher than that of the message, or may be transmitted at a low coding rate. Also, in contention based transmission, the signal corresponding to the message and the signal corresponding to UE ID may be transmitted by being identified from each other. For example, in contention based transmission, the message and UE ID may be performed in their respective resource regions different from each other.

For example, if the signal transmitted in a contention based UL transmission scheme is SR, BSR and/or PUSCH, UE ID may be transmitted in the form of PUCCH. PUCCH for transmission of UE ID may be transmitted together with SR, BSR and/or PUSCH. PUCCH for transmission of UE ID may be transmitted from a PUCCH region (i.e., control region) or a PUSCH region (i.e., data region). If PUCCH for carrying UE ID is transmitted together with SR, BSR and/or PUSCH from the PUSCH region, a region where PUCCH is transmitted even within the PUSCH region may be identified from the region where SR, BSR and/or PUSCH is transmitted. For example, PUCCH for transmission of UE ID may be transmitted from the last symbol(s) of a data region on a time domain, a symbol to which UL RS is transmitted, or symbol(s) adjacent to the symbol to which UL RS is transmitted. PUCCH for transmission of UE ID may be transmitted from the same frequency domain as that of SR, BSR and PUSCH on the frequency domain.

According to one embodiment of the present invention, UE ID may be transmitted by being time divisional multiplexed (TDMed). HARQ process number, information as to initial transmission or retransmission, RV index and/or resource allocation information on data may additionally be transmitted to PUCCH (e.g., new UCI defined for delivery of UE ID) for transmission of UE ID. Meanwhile, a PUCCH format which includes a UE ID field may newly be defined for transmission of UE ID, or UE ID may be delivered by being included in SR/BSR/PUSCH TB without definition of a PUCCH format. OFDM symbol or a previously defined region of resources for PUSCH transmission may be used for transmission of UE ID. Also, the contents (e.g., HARQ process number, etc.) suggested as above may be included even though UE ID is transmitted in the form of PUSCH, and a power/coding rate may be given separately.

For another example, PUCCH for UE ID delivery and message may be transmitted on their respective resource pools (e.g., different subframes) different from each other. At this time, the PUCCH may include resource allocation information for which SR/BSR/PUSCH transmission associated with the corresponding PUCCH is performed. That is, a UE which desires to transmit SR/BSR/PUSCH may previously perform PUCCH transmission including UE ID, and resource allocation information on SR/BSR/PUSCH transmission and UE ID may be included in the corresponding PUCCH. Also, a resource pool for PUCCH transmission may be signaled to the UE separately from a resource pool for PUSCH transmission, and a different power and/or coding rate may be configured in each resource pool. A resource region for PUCCH transmission may be delivered through UE-specific RRC signaling.

The UE may transmit UE ID information together during contention based transmission using the above methods, and if the network successfully performs decoding for PUCCH transmission and decoding for PUSCH transmission, the network may signal ACK message to the corresponding UE. If the network successfully performs PUCCH decoding but fails to perform PUSCH decoding, the network may signal NACK message to the corresponding UE based on UE ID acquired from the PUCCH. If the network fails to perform both PUCCH decoding and PUSCH decoding, the network cannot specify the transmitting UE, whereby the network may not perform additional operation. Alternatively, if the network fails to detect UE ID, the network may broadcast NACK to a plurality of unspecified UEs.

If the UE receives ACK/NACK message, the UE may perform new transmission or retransmission in accordance with the received ACK/NACK message. If the UE fails to receive the ACK/NACK message, the UE may perform PUCCH/PUSCH retransmission or request the network of switching to grant based transmission. If the UE performs retransmission, there may be a method (hereinafter, Type 1) for lowering the probability of collision by increasing a coding rate or performing retransmission in a resource pool of a great size and a method (hereinafter, Type 2) for performing transmission by boosting a power even though retransmission is performed in the same resource pool. For example, if the UE receives NACK message, the UE may perform Type 1 retransmission, and if the UE fails to receive ACK/NACK message, the UE may perform Type 2 retransmission.

Additionally, if UE-specific NACK signaling is available in contention based transmission, grant based transmission may be applied to retransmission. That is, contention based transmission may be defined by being limited to initial transmission. For example, NACK signaling of ACK/NACK signaling for contention based transmission may include resource allocation for retransmission, power boosting/de-boosting information, MCS information, etc. In case of ACK signaling, ACK information may be specified or information (e.g., MCS/resource allocation information) for performing initial/re-transmission may be included in corresponding ACK/NACK signaling. For example, if MCS/resource allocation information included in ACK/NACK signaling is null or a specific state, the UE may recognize that UL transmission is ACK and then there is no PUSCH transmission.

The ACK/NACK signaling suggested as above may be indicated using NDI, MCS, etc. of the legacy DCI. For example, ACK/NACK signaling for PUCCH/PUSCH transmitted by the UE may be transmitted in the form of UL grant. At this time, ACK/NACK field for ACK/NACK signaling is not defined in UL grant separately, and different ACK/NACK states may be indicated in accordance with a combination of field values within UL grant. For example, although an NDI field of UL grant may be toggled and corresponds to initial transmission indication, if MCS (and/or resource allocation, DMRS CS, etc.) field is a null state or a predefined specific state, this may mean that the existing UL transmission associated with the corresponding UL grant is ACK. A separate ACK/NACK field is not defined for UL grant even in case of NACK signaling. Instead, if the legacy field(s) is(are) a specific state or specific combination, it may be defined as NACK.

<Hybrid Multiple Access Scheme>

As another method for increasing reliability in contention based UL transmission, a hybrid scheme of contention based transmission and contention free based transmission (e.g., grant based transmission) may be used.

A hybrid multiple access scheme may be implemented by interacting with resource allocation and ACK/NACK signaling suggested as above. For example, the UE may request the network of switching to grant based UL transmission if the UE fails to receive ACK for contention based UL transmission for a certain time, if the UE fails to receive ACK in spite of retransmission performed for a specific number of times, and/or if the UE receives NACK for a certain number of times.

For example, the UE which has fulfilled the above condition may allow the network to perform scheduling of UL transmission using orthogonal resources or semi-orthogonal resources by transmitting a scheduling request (SR). To this end, each UE may previously be allocated SR resources through UE (or UE group)-dedicated signaling.

Meanwhile, the SR resources may be configured periodically, and in this case, the UE may be operated as follows. The UE which has performed contention based UL transmission at a first timing point performs retransmission while maintaining a contention based scheme until SR resources (second timing point) closest to the first timing point or SR resources (third timing point) the closest to each other among those spaced apart from the first timing point at SR period or more. However, if the UE fails to receive ACK signal until SR resources corresponding to the second timing point or the third timing point, the UE may request UL grant by transmitting SR through the corresponding SR resources.

As described above, contention based transmission and grant based transmission may be identified from each other depending on initial transmission/retransmission. That is, in order to reduce overhead due to initial resource allocation, a method of contention based transmission may be performed for initial transmission, and then grant based transmission may be performed for efficient transmission and reception in retransmission.

As another method, contention based/grant based transmission may be determined per UL channel and/or signal. For example, in case of mMTC, it may be difficult to allocate UE dedicated SR resources due to a large number of UEs. Therefore, in case of mMTC, SR transmission may be performed in based contention transmission, and the network which has successfully received the corresponding SR may transmit UL grant to the UE by responding to the SR. ACK/NACK for the contention based SR may be replaced with UL grant corresponding thereto. For example, if the UE fails to receive UL grant, it may be regarded as NACK for SR, and the methods suggested as above may be used for signaling of ACK/NACK through UL grant. For example, the UE may determine ACK/NACK through each field value within the UL grant or combination of the field values, or NACK broadcasting or the like may be introduced.

<Configuration of Contention Based UL Transmission>

If a specific number of UEs or more exist within coverage, contention based transmission may be inefficient due to increase of the probability of collision. Therefore, the network may indicate, to UEs within coverage, switching to contention free UL transmission (e.g., grant based UL transmission) through a broadcast signal (e.g., MIB/SIB) or higher layer signaling if a certain number of UEs or more, which have accessed a corresponding cell, exist and/or a ratio of decoding success to resources does not reach a certain level. Such switching of UL transmission scheme may be indicated to UEs within coverage, or may be indicated UE-individually or in UE-group. For example, if a UE which prefers a specific analog beam corresponds to a certain level or more, the base station may indicate UEs associated with the corresponding analog beam to perform grant-based UL transmission.

<Contents Transmitted Based on Contention>

Contents transmitted to an uplink may be classified into data, scheduling request (SR), buffer status report (BSR), ACK/NACK for DL transmission, channel state information (CSI), sounding reference signal (SRS) for UL channel measurement, and random access related PRACH.

According to one embodiment of the present invention, some of UL contents may be transmitted based on contention, and the other some of the UL contents may be transmitted based on grant. For example, it is preferable that channel state information between the base station and the UE and ACK/NACK signaling for DL transmission, SRS, etc. are transmitted from a given resource or based on a request of the base station. On the other hand, it is preferable that UL data, SR, BSR, PRACH, etc., which are generated by the need of the UE, are transmitted based on contention to reduce signaling overhead and latency. Additionally, contention based transmission of the UL data may be determined depending on a size (that is, the amount of resources required for UL transmission) of data. For example, data of a specific size or less may be transmitted based on contention, and data greater than the specific size may previously be defined to be transmitted based on grant, or may be indicated by the network. Methods for performing contention based transmission per UL contents will be suggested as follows.

(1) Scheduling Request (SR)

In the legacy LTE, UE-dedicated resources for SR transmission may be defined, and the UE may request the network of UL resources by transmitting SR to the corresponding resources. However, in the NR for supporting massive connectivity, if SR resources are allocated to all devices that can perform UL transmission, a large amount of resources are reserved, whereby the resources may be used inefficiently. Therefore, one embodiment of the present invention suggests that SR should be transmitted based on contention.

In contention based SR transmission, a problem may occur in that the network cannot specify a transmitting UE. Therefore, it is preferable that information for UE identification, such as UE ID, is included in SR during contention based SR transmission. At this time, UE ID may be transmitted together with SR or independently.

In the legacy LTE, since the SR is transmitted from UE dedicated resources and only serves to notify whether UL scheduling is required, the SR is defined by 1-bit signaling. However, if the SR is transmitted based on contention in accordance with the embodiment of the present invention, the UE transmits its UE ID (or information corresponding to UE ID) only, whereby the legacy 1-bit SR transmission may be replaced with such transmission. That is, the UE which requires UL resources transmits UE ID based on contention in a given resource pool. The network which has successfully performed decoding of the corresponding message including UE ID may allocate UL resources to the UE. At this time, UL grant for allocating UL resources may be construed as ACK signaling for SR.

As described above, if information such as UE ID is included in the SR, the corresponding SR transmission may further include additional information. For example, BSR may be included in the SR to specifically indicate the amount of UL resources. That is, although the SR and the BSR have been transmitted individually in the legacy LTE system, the SR and the BSR may be transmitted together based on contention in accordance with the embodiment of the present invention. Also, separately from the BSR included in the SR, BSR information may be included in data for UL transmission performed after the SR. This may be intended for increasing/reducing the amount of UL resources which are scheduled. The UE may include the BSR in UL data in accordance with a request of the network or its decision.

As still another example for transmitting SR (and/or BSR) based on contention, the UE may transmit UE ID and the SR (and/or BSR) independently. In this case, resource allocation information to which SR (and/or BSR) is transmitted may be included in a region to which UE ID is transmitted, a correlation between the resource to which UE ID is transmitted and the resource to which SR (and/or BSR) is transmitted may be defined previously or signaled by the network. Alternatively, the SR (and/or BSR) may be transmitted independently regardless of the correlation between the resource to which UE ID is transmitted and the resource to which the SR (and/or BSR) is transmitted. In this case, the network may perform blind detection for both of the two messages. Information on UL resources required for the corresponding UE and information (e.g., serving cell and/or measurement of beams) required for UL scheduling may be included in SR transmission.

(2) Data Transmission

If a size of data to be blind-detected by the base station or the amount of resources used for data transmission exists at various levels in contention based UL data transmission, complexity in a reception operation of the base station may be increased remarkably. Also, if UL transmissions having a big difference in the amount of resources are transmitted on the same resource region, it is likely that reception performance in UL transmission having a relatively small amount of resources is lowered due to interference from UL transmission having a relatively great amount of resources.

To solve the above problem, in one embodiment of the present invention, the amount of resources that may be transmitted and received may previously be defined in a resource region (e.g., a resource pool for contention based transmission) where contention based transmission is performed. For example, contention based UL transmissions having different resource sizes may be performed in different resource pools. Alternatively, UL transmissions having different resource sizes previously defined or by network signaling may be performed on the same resource region.

To solve the problem that the transmitting UE cannot be specified due to a property of contention based transmission in the same manner as the above SR transmission, information (e.g., UE ID) for UE identification may be transmitted together with data or independently. If UE ID and data are transmitted together, UE ID may be transmitted in the form of a higher layer message by being included in data. Alternatively, UE ID is included in a data transmission resource unit but is transmitted by being separated from actual data in a frequency/time domain, whereby UE ID may be self-decodable. In this case, separate transmission may mean that coding chains of data and UE ID are configured differently.

The base station may perform decoding for each of UE ID and data, and a correlation (e.g., time/frequency offset) between respective resources to which UE ID and data are transmitted may be included in UE ID transmission as additional information, or may previously be defined/configured. For example, the network may broadcast information on the correlation between the respective resources within coverage or transmitted UE-specific signaling or UE group-specific signaling. As another method, the correlation between the resource for transmission of UE ID and the resource for data transmission may be defined based on a channel bandwidth or a size of a resource pool. Definition of this resource correlation may equally be applied to the aforementioned SR related embodiment.

<Scrambling for Contention Based Transmission>

If UE ID and data (or SR) are transmitted independently, their respective scrambling may be configured as follows.

(1) Cell ID (and/or Beam ID) Based Scrambling

For randomization of inter-cell interference and/or inter-beam interference, scrambling based on cell ID and/or beam ID may equally be applied to UE ID and data.

(2) UE ID Based Scrambling

Collision between UL transmissions of different UEs may occur in view of properties of contention based transmission, and UE ID based scrambling may be applied to UE ID and data to randomize interference due to collision.

If UE ID based scrambling is performed, decoding complexity in the base station may be increased. Therefore, to reduce decoding complexity, the base station may previously designate a resource pool, which can be used for each UE or UE group. The UE may transmit UE ID and data, to which UE ID based scrambling is applied, within the allocated resource pool in accordance with a contention based transmission scheme.

(3) Combination of UE ID and Cell ID based scrambling

If UE ID and data are scrambled based on UE ID, decoding complexity of the base station may be increased.

To solve such complexity, the UE may perform cell ID and/or beam ID based scrambling for UE ID and perform UE ID based scrambling for data, thereby performing contention based transmission.

<ACK/NACK Signaling for Contention Based Transmission>

If the legacy SR transmission is replaced with contention based UE ID (+additional information) transmission as suggested above, ACK/NACK signaling for corresponding contention based transmission may be replaced with the presence of UL grant for scheduling UL resources. That is, the UE which has received UL grant after contention based SR transmission may regard that the corresponding UL transmission has been successfully performed. On the other hand, the UE which has failed to receive UL grant may regard that the corresponding UL transmission as NACK and perform a subsequent procedure such as retransmission.

If UE ID and data (or SR) are transmitted independently, the following cases may exist in accordance with a decoding result of each of UE ID and data.

(1) Case 1: UE ID decoding success and data decoding success

The network may deliver ACK message to the corresponding UE based on the received UE ID through a format such as DCI.

(2) Case 2: UE ID decoding success and data decoding failure

The network may deliver NACK message to the corresponding UE based on the received UE ID through a format such as DCI. The UE which has received the NACK message may regard that UE ID transmission has been successfully performed but data transmission has been failed, and then may be operated as follows.

In the following case, retransmission for data may be performed by using redundancy version (RV) index different from that of previous transmission. In this case, the base station may perform combining by applying an increment redundancy (IR) scheme to data in each transmission. Alternatively, if the RV index is fixed, the base station may perform combining data of each transmission by using a chase combining scheme.

The UE may perform retransmission for UE ID and data through contention based transmission. At this time, in order to increase the probability of success of retransmission, a resource pool for retransmission may be allocated independently from a resource pool for initial transmission. Alternatively, for retransmission of UE ID and data, the base station may transmit the NACK message for data by including resource allocation information, power information for retransmission and/or MCS information in the NACK message.

The UE may perform only retransmission for data. To this end, the base station may allocate a resource for retransmission to the NACK message, or the UE may determine a resource for retransmission on the basis of a predefined rule (for example, retransmission is performed in UL resource after a specific time (previously defined or signaled by the base station) after the NACK message is received). Additionally, some or all of a power and MCS in retransmission may be signaled through the NACK message.

(3) Case 3: UE ID decoding failure

If the base station fails to decode UE ID, since the base station cannot specify the transmitting UE, the base station cannot transmit ACK/NACK message. In this case, the UE which has failed to receive the ACK/NACK message may perform contention based transmission for UE ID and data (or SR). At this time, a resource pool for retransmission may be configured separately from a resource pool for initial transmission, or may previously be defined.

Figure 8:
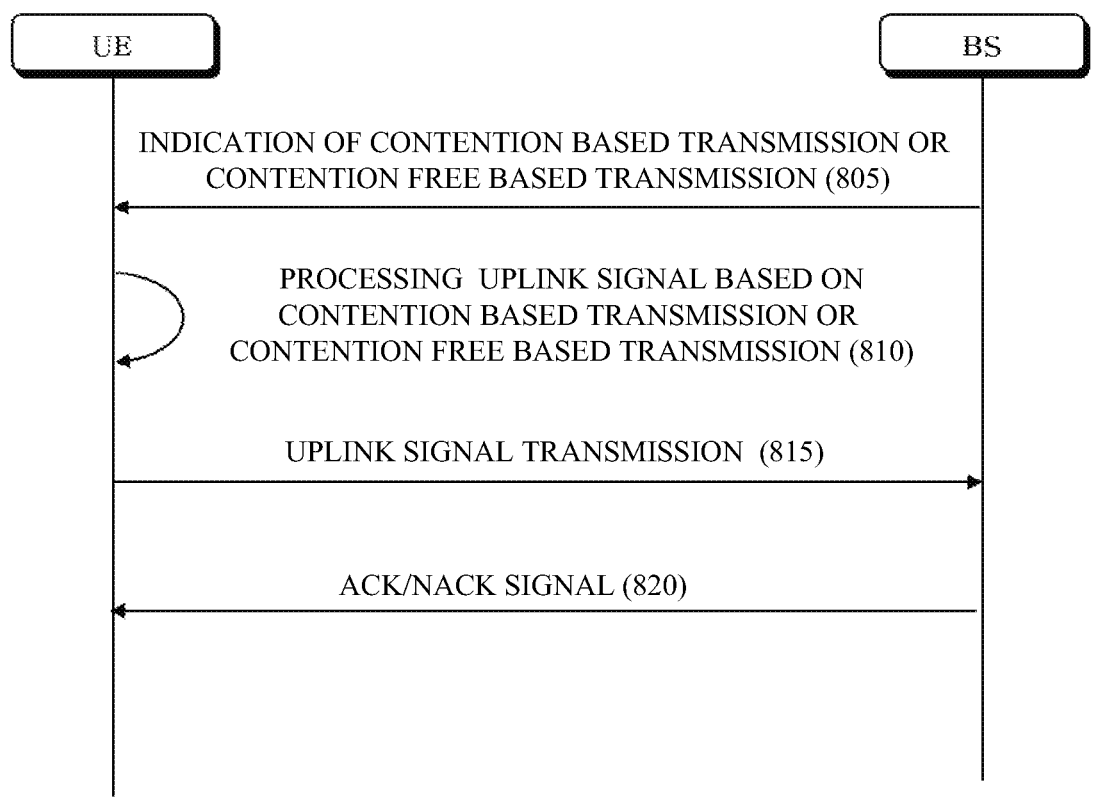
FIG. 8 is a diagram illustrating a method for transmitting or receiving a signal in accordance with one embodiment of the present invention.

FIG. 8 is a diagram illustrating a method for transmitting or receiving an uplink signal in accordance with one embodiment of the present invention. Description repeated with the aforementioned description will be omitted.

Referring to FIG. 8, the UE receives information indicating one of a contention based transmission scheme and a contention free based transmission scheme from the base station (805). If the number of UEs which have accessed a cell of the base station is greater than a threshold value, the received information may indicate the contention free based transmission scheme, and if the number of UEs which have accessed the cell of the base station is less than the threshold value, the received information may indicate the contention based transmission scheme.

The UE processes and transmits UL data in a transmission scheme indicated by the received information (810, 815).

If the indicated transmission scheme is a contention based transmission scheme, the UE additionally transmits information for identifying the UE to the UL data.

Although the information for identifying the UE may be an identifier (e.g., RNTI), the present invention is not limited to this identifier, and information for identifying the UE or UE group directly/indirectly may be used. For example, RS parameter and resource pool information (e.g., time/frequency resources) for performing contention based transmission may be defined UE specifically or UE group specifically, or may be signaled by the base station, and the base station may identify the UE through this information.

At this time, the UE may prioritize transmission success of additionally transmitted information for identifying the UE, over transmission success of the UL data. Prioritizing transmission success of the information for identifying the UE may include at least one of setting a transmission power of the information for identifying the UE to be greater than a transmission power of the UL data, setting a coding rate of the information for identifying the UE to be lower than a coding rate of the UL data, transmitting the information for identifying the UE and the UL data on different resource pools, and scrambling the information for identifying the UE at a scrambling value having blind detection complexity lower than that of the UL data. The UL data may be scrambled by the information for identifying the UE, and the information for identifying the UE may be scrambled by a cell identifier of the base station.

The base station attempts to detect UL data of the UE in accordance with a transmission scheme indicated by itself. If the indicated transmission scheme is a contention based transmission scheme, the base station attempts to detect information for identifying the UE in addition to UL data. The UL data may be de-scrambled by the information for identifying the UE, and the information for identifying the UE may be de-scrambled by a cell identifier of the base station.

The base station transmits ACK (acknowledge) signal or NACK (negative ACK) signal in accordance with whether the base station succeeded in detection of detecting the uplink data (820). If the base station successfully detects the UL data and the information for identifying the UE, the base station may transmit ACK signal. If the base station has successfully detected the information for identifying the UE but has failed to detect the UL data, the base station transmits a UE-specific NACK (negative ACK) signal. The UE-specific NACK (negative ACK) signal may include UL grant for retransmission of the UL data. The base station may receive the UL data retransmitted by the contention free based transmission scheme based on the UL grant. If the base station fails to detect the information for identifying the UE, the base station may transmit a broadcast NACK signal.

If the ACK (acknowledge) signal is received, the UE determines that transmission of the UL data and transmission of the information for identifying the UE have been successfully performed. If the UE-specific NACK (negative ACK) signal is received, the UE determines that transmission of the information for identifying the UE has been successfully performed but transmission of the UL data has been failed.

The UE-specific NACK (negative ACK) signal may include the UL grant for retransmission of the UL data, and the UE may retransmit the UL data based on the UL grant in accordance with the contention free based transmission scheme.

If ACK (acknowledge) signal for transmission of the UL data according to the contention based transmission scheme is not received for a certain time period or NACK (negative ACK) signal is received for a certain number of times or more, the UE may perform switching to the contention free based transmission scheme. The UE may request the base station of switching to the contention free based transmission scheme by transmitting a scheduling request signal. The scheduling request signal may be transmitted in accordance with the contention based transmission scheme. The scheduling request signal may include at least one of information for identifying the UE and a buffer state report.

Figure 9:
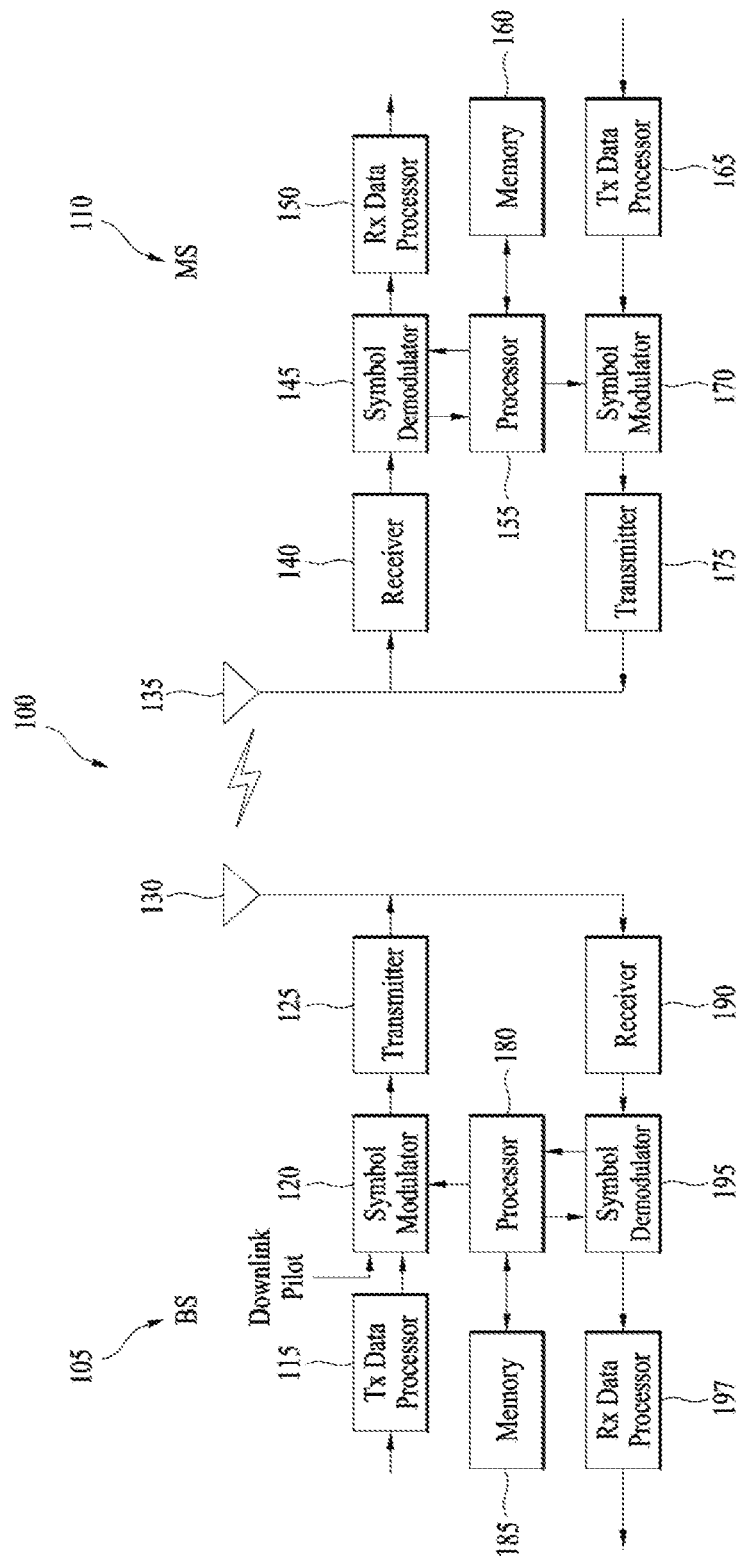
FIG. 9 is a diagram illustrating a UE and a base station according to one embodiment of the present invention.

FIG. 9 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 9, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples.

The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method for transmitting an uplink signal by a user equipment (UE) in a wireless communication system, the method comprising:
    receiving, from a base station, information indicating one of a contention based transmission scheme or a contention free based transmission scheme; and
    transmitting uplink data based on a transmission scheme indicated based on the received information,
    wherein based on the indicated transmission scheme being the contention based transmission scheme, the UE transmits, in addition to the uplink data, information for identifying the UE, and the UE prioritizes transmission success of the information for identifying the UE, which is additionally transmitted, over transmission success of the uplink data,
    wherein the UE determines that both the transmission of the uplink data and the transmission of the information for identifying the UE have been successfully performed based on an acknowledge (ACK) signal being received,
    wherein the UE determines that the transmission of the information for identifying the UE has been successfully performed but the transmission of the uplink data has failed, based on a UE-specific negative ACK (NACK) signal being received, and wherein the UE determines that both the transmission of the uplink data and the transmission of the information for identifying the UE have failed based on a broadcast NACK signal being received without reception of the ACK signal.

2. The method of claim 1, wherein the UE sets a transmission power of the information for identifying the UE to be greater than a transmission power of the uplink data, sets a coding rate of the information for identifying the UE to be lower than a coding rate of the uplink data, transmits the information for identifying the UE and the uplink data on different resource pools, or scrambles the information for identifying the UE at a scrambling value having blind detection complexity lower than that of the uplink data.

3. The method of claim 2, wherein the uplink data is scrambled by the information for identifying the UE, and the information for identifying the UE is scrambled by a cell identifier of the base station.

4. The method of claim 1, wherein:
if a number of UEs which have accessed a cell of the base station is greater than a threshold value, the received information indicates the contention free based transmission scheme, and
if the number of UEs which have accessed the cell of the base station is less than the threshold value, the received information indicates the contention based transmission scheme.

5. The method of claim 1,
wherein the UE-specific NACK signal includes an uplink grant for retransmission of the uplink data, and
wherein the UE retransmits the uplink data based on the uplink grant in accordance with the contention free based transmission scheme.

6. The method of claim 1, wherein the UE switches to the contention free based transmission scheme if an acknowledge (ACK) signal for transmission of the uplink data according to the contention based transmission scheme is not received for a certain time period or a negative ACK (NACK) signal is received for a certain number of times or more.

7. The method of claim 6,
wherein the UE requests the base station of switching to the contention free based transmission scheme by transmitting a scheduling request signal, and
wherein the scheduling request signal is transmitted based on the contention based transmission scheme.

8. The method of claim 7, wherein the scheduling request signal includes at least one of the information for identifying the UE or a buffer state report.

9. A user equipment (UE) for transmitting an uplink signal in a wireless communication system, the UE comprising:
a receiver;
a transmitter; and
a processor for receiving, from a base station, information indicating one of a contention based transmission scheme or a contention free based transmission scheme by controlling the receiver, and transmitting uplink data based on a transmission scheme indicated based on the received information by controlling the transmitter,
wherein based on the indicated transmission scheme being the contention based transmission scheme, the processor transmits, in addition to the uplink data, information for identifying the UE, and the processor prioritizes transmission success of the information for identifying the UE, which is additionally transmitted, over transmission success of the uplink data,
wherein the UE determines that both the transmission of the uplink data and the transmission of the information for identifying the UE have been successfully performed based on an acknowledge (ACK) signal being received,
wherein the UE determines that the transmission of the information for identifying the UE has been successfully performed but the transmission of the uplink data has failed, based on a UE-specific negative ACK (NACK) signal being received, and
wherein the UE determines that both the transmission of the uplink data and the transmission of the information for identifying the UE have failed based on a broadcast NACK signal being received without reception of the ACK signal.

10. A method for receiving an uplink signal by a base station in a wireless communication system, the method comprising:
transmitting information indicating one of a contention based transmission scheme or a contention free based transmission scheme;
attempting to detect uplink data of a user equipment (UE) based on a transmission scheme indicated based on the transmitted information; and
transmitting an acknowledge (ACK) signal or a negative ACK (NACK) signal to the UE in accordance with whether the base station succeeded in detecting the uplink data,
wherein based on the indicated transmission scheme being the contention based transmission scheme, the base station attempts to detect information for identifying the UE, in addition to the uplink data, and based on the base station succeeding in detecting both the uplink data and the information for identifying the UE, the base station transmits the ACK signal,
wherein the base station transmits a UE-specific negative ACK (NACK) signal if detection of the information for identifying the UE has been successfully performed but detection of the uplink data has failed, and
wherein the base station transmits a broadcast NACK signal if detection of the information for identifying the UE has failed.

11. The method of claim 10,
wherein the UE-specific NACK signal includes an uplink grant for retransmission of the uplink data, and
wherein the base station receives the uplink data retransmitted by the contention free based transmission scheme based on the uplink grant.

12. The method of claim 10, wherein the uplink data are de-scrambled by the information for identifying the UE, and the information for identifying the UE is de-scrambled by a cell identifier of the base station.

13. The method of claim 10,
wherein, if a number of UEs which have accessed a cell of the base station is greater than a threshold value, the transmitted information indicates the contention free based transmission scheme, and
wherein if the number of UEs which have accessed the cell of the base station is less than the threshold value, the transmitted information indicates the contention based transmission scheme.

* * * * *